US010294115B2

(12) United States Patent
Gerard et al.

(10) Patent No.: US 10,294,115 B2
(45) Date of Patent: May 21, 2019

(54) PCC WITH REDUCED PORTLANDITE CONTENT

(71) Applicant: Omya International AG, Oftringen (CH)

(72) Inventors: Daniel E. Gerard, Basel (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 65 days.

(21) Appl. No.: 15/518,395

(22) PCT Filed: Oct. 20, 2015

(86) PCT No.: PCT/EP2015/074205
§ 371 (c)(1),
(2) Date: Apr. 11, 2017

(87) PCT Pub. No.: WO2016/062682
PCT Pub. Date: Apr. 28, 2016

(65) Prior Publication Data
US 2017/0305755 A1 Oct. 26, 2017

Related U.S. Application Data

(60) Provisional application No. 62/073,071, filed on Oct. 31, 2014.

(30) Foreign Application Priority Data

Oct. 24, 2014 (EP) .................................... 14190261

(51) Int. Cl.
C01F 11/18 (2006.01)
D21H 17/67 (2006.01)
D21H 19/38 (2006.01)

(52) U.S. Cl.
CPC ............ *C01F 11/182* (2013.01); *C01F 11/18* (2013.01); *D21H 17/675* (2013.01); *D21H 19/385* (2013.01); *C01P 2002/70* (2013.01); *C01P 2004/51* (2013.01); *C01P 2004/61* (2013.01); *C01P 2004/62* (2013.01); *C01P 2006/12* (2013.01); *C01P 2006/22* (2013.01); *C01P 2006/80* (2013.01)

(58) Field of Classification Search
CPC .................................................... C01F 11/182
See application file for complete search history.

(56) References Cited

U.S. PATENT DOCUMENTS

| 3,197,322 | A | * | 7/1965 | Maskal | ................. | C01F 11/181 |
| | | | | | | 106/464 |
| 4,159,312 | A | * | 6/1979 | Shibazaki | ............. | C01F 11/185 |
| | | | | | | 106/464 |
| 5,332,564 | A | | 7/1994 | Chapnerkar et al. | | |
| 5,695,733 | A | | 12/1997 | Kroc et al. | | |
| 5,741,471 | A | | 4/1998 | Deutsch et al. | | |
| 5,759,258 | A | | 6/1998 | Sohara et al. | | |
| 5,811,070 | A | | 9/1998 | You | | |
| 6,602,484 | B1 | | 8/2003 | Virtanen | | |
| 2015/0210559 | A1 | | 7/2015 | Skrzypczak et al. | | |

FOREIGN PATENT DOCUMENTS

| CN | 1193602 A | 9/1998 |
|---|---|---|
| CN | 1657413 A | 8/2005 |
| CN | 101591033 A | 12/2009 |
| EP | 2371766 A1 | 10/2011 |
| EP | 2447213 A1 | 5/2012 |
| EP | 2524898 A1 | 11/2012 |
| JP | 2001294422 A | 10/2001 |
| JP | 2010077009 A | 4/2010 |
| WO | 9628517 A1 | 9/1996 |
| WO | 9816471 A1 | 4/1998 |
| WO | 9951691 A1 | 10/1999 |
| WO | 2006109168 A2 | 10/2006 |
| WO | 2006109171 A1 | 10/2006 |
| WO | 2010018432 A1 | 2/2010 |
| WO | 2012156231 A1 | 11/2012 |
| WO | 2013142473 A1 | 9/2013 |
| WO | 2014060286 A1 | 4/2014 |
| WO | 2014128087 A1 | 8/2014 |

OTHER PUBLICATIONS

International Search Report dated Jan. 7, 2016 for PCT/EP2015/074205.
Written Opinion of the International Searching Authority dated Jan. 7, 2016 for PCT/EP2015/074205.
Tran et al. "Facile surface modification of nanoprecipitated calcium carbonate by adsorption of sodium stearate in aqueous solution." Colloids and Surfaces A: Physicochemical and Engineering Aspects: 366 (2010) 95-103.
Examination Report dated Aug. 25, 2017 for Australian Application No. 2015335077.
Office Action dated Apr. 3, 2018 for Chinese Application No. 201580057736.5.
European Search Report dated Apr. 10, 2015 for European Application No. 14190261.9.
Office Action dated Jun. 25, 2018 for European Application No. 15781927.7.
Office Action dated Feb. 27, 2018 for Japanese Application No. 2017-522183.

(Continued)

*Primary Examiner* — Stuart L Hendrickson
(74) *Attorney, Agent, or Firm* — Amster, Rothstein & Ebenstein LLP

(57) ABSTRACT

The present invention is directed to a process for producing an aqueous suspension of precipitated calcium carbonate, wherein a milk of lime is prepared by mixing water, a calcium oxide containing material, and a precipitation enhancer, and subsequently, the milk of lime is carbonated to form an aqueous suspension of precipitated calcium carbonate.

27 Claims, No Drawings

(56) References Cited

OTHER PUBLICATIONS

Office Action dated Sep. 20, 2017 for Korean Application No. 10-2017-7013934.
Search Report dated May 11, 2018 for Russian Application No. 2017117662.
Decision to Grant dated May 15, 2018 for Russian Application No. 2017117662.
Written Opinion dated Jan. 18, 2018 for Singapore Application No. 11201703277Y.
Examination Report dated Oct. 26, 2016 for Taiwan Application No. 104127871.
JPO, Translation of the Office Action, in related patent application No. 2017-522183, dated Feb. 27, 2018, 14 pages.
SIPOPRC, Translation of the Search Report and Office Action, in related patent application No. 201580057736.5, dated Apr. 3, 2018, 10 pages.
SIPOPRC, Translation of the Office Action, in related patent application No. 201580057736.5, dated Dec. 5, 2018, 11 pages.
EPO, Extended European Search Report, in related patent application No. 14190261.9 dated Apr. 10, 2015, 7 pages.
EPO, Office Action, in related patent application No. 15781927.7, dated Jun. 25, 2018, 4 pages.
TIPO, Translation of the Examination report and Search Report, in related patent application No. 104127871, dated Oct. 26, 2016, 6 pages.
TIPO, Notice of Allowance and Translation, in related patent application No. 104127871, dated Feb. 17, 2017, 3 pages.
AU, Examination Report, in related patent application No. 2015335077, dated Aug. 25, 2017, 5 pages.
KIPO, Translation of the Office Action, in related patent application No. 10-2017-7013934, dated Sep. 20, 2017, 6 pages.
KIPO, Translation of the Notice of Final Rejection, in related patent application No. 10-2017-7013934, dated May 28, 2018, 4 pages.
Rospatent, Translation of the Search Report, in related patent application No. 2017117662, dated Nov. 5, 2018, 2 pages.
Rospatent, Translation of the Decision to Grant, in related patent application No. 2017117662, dated May 15, 2018, 8 pages.

* cited by examiner

PCC WITH REDUCED PORTLANDITE CONTENT

CROSS-REFERENCE TO RELATED APPLICATIONS

This is a U.S. national phase of PCT Application No. PCT/EP2015/074205, filed Oct. 20, 2015, which claims priority to European Application No. 14190261.9, filed Oct. 24, 2014 and U.S. Provisional Application No. 62/073,071, filed Oct. 31, 2014.

The present invention relates to a process for the production of precipitated calcium carbonate, a precipitated calcium carbonate obtained by said process, and its use.

Calcium carbonate is one of the most commonly used additives in the paper, paint and plastics industries. While naturally occurring ground calcium carbonate (GCC) is usually used as a filler in many applications, synthetically manufactured precipitated calcium carbonate (PCC) may be tailor-made with respect to its morphology and particle size allowing PCC to fulfil additional functions.

Commonly known PCC production processes include the steps of slaking quicklime with water, whereby a suspension of fine particles of calcium hydroxide, also known as portlandite, is formed, and subsequently precipitating calcium carbonate by passing carbon dioxide through the resulting portlandite suspension. The carbon dioxide dissolves and dissociates in the water, providing carbonate ions to react with the free calcium ions from the dissolved portlandite. This leads to an oversaturation of calcium carbonate in solution, resulting in the precipitation of calcium carbonate. As calcium carbonate forms, more portlandite dissolves. Therefore, the highest point of the calcium carbonate concentration is near the surface of the portlandite particles, and consequently, in this region the oversaturation is at its maximum. As the PCC continues to grow near to the surface of the portlandite particle, some of the portlandite may get overgrown, and incorporated in or associated with the forming PCC. The result is a precipitated calcium carbonate containing a significant amount of residual portlandite, which can be as high as 10 wt.-%. With time, the portlandite can leach into the water phase, resulting in high alkalinity of the sample.

Depending on the field of application, such high alkalinity may have a negative impact. For example, the high alkalinity of the filler can promote association of volatiles, and especially water, with the mineral filler. If such a filler is employed in polymer or plastic applications, gas bubbles may form during the production process of the polymer or plastic. This may lead to formation of defects resulting from the gas bubbles during plastic production, for example, during the melting or extrusion step. In polymer film extrusion such gas bubbles can become elongated and "frozen" in the fabricated film, taking on the shape of a lens, a phenomenon also known as "lensing". The afore-mentioned effects may result in degradation of the quality of the final mineral-comprising polymer product during the processing of such mineral filler-comprising products. Moreover, associated volatiles may lead to a reduction in the tensile and tear strength of a breathable film, and may degrade its visible aspects, in particular its visible uniformity. Volatiles can also generate excessive foaming of the mineral filled polymer melt during a step of compounding, causing unwanted product build-up at the vacuum extraction, and hence, forcing a reduced output rate.

WO 99/51691 A1 describes a method of producing a precipitated calcium carbonate (PCC) product having a coarse crystalline form, which inter alia comprises the step of preparing a suspension in an aqueous medium of calcium hydroxide particles which partially dissolve, thus providing calcium ions in the aqueous medium, the aqueous medium also incorporating an agent which promotes release into solution in the aqueous medium of calcium ions from the calcium hydroxide, wherein said agent comprises a water-soluble organic compound. U.S. Pat. No. 5,695,733 A discloses precipitated calcium carbonate particles in clustered form, which when used as fillers impart improved strength, opacity and other advantages to paper, and are prepared by a process involving adding lime and carbon dioxide to a reaction mixture containing seed material having a scalenohedral morphology, the lime and carbon dioxide being added simultaneously.

U.S. Pat. No. 5,741,471 A relates to a process for the precipitation of discrete prismatic calcium carbonate particles by carbonation of aqueous calcium hydroxide containing a saccharide, a polysaccharide, or a saccharide or polysaccharide and a metal ion. U.S. Pat. No. 5,332,564 A describes a process for producing rhombic or barrel shaped precipitated calcium carbonate. Quicklime is slaked in an aqueous solution containing about 0.1% to about 2% by weight of a sugar, based upon the weight of the $CaCO_3$ to be produced. U.S. Pat. No. 5,811,070 A discloses a process for producing calcium carbonate particles having an average size of 0.1 to 1.0 µm, the process comprising the steps of introducing carbon dioxide into a milk of lime containing a first reagent to prepare an aqueous suspension containing calcium carbonate particles of 0.4 µm in average size, adding a milk of lime into the aqueous suspension, and continuously reacting a carbonated solution containing a second reagent with the aqueous suspension.

WO 2006/109168 A2 and WO 2006/109171 A1 are concerned with a carbonation process using a reduced flow rate of carbon dioxide, which leads to porous agglomerates of precipitated calcium carbonate of a very specific structure and unique properties, followed by an up-concentration step to increase the solids content. A process for preparing a precipitated calcium carbonate involving the use of a specific polymer during the carbonation step is disclosed in WO 2010/018432 A1.

In view of the foregoing, there is a continuous need for processes providing precipitated calcium carbonate, and especially for processes that allow the production of PCC with a low portlandite content.

Accordingly, it is an object of the present invention to provide a process for producing a PCC slurry with a low portlandite content. It is also desirable that said process does not affect the kinetics of the carbonation step in a negative way and/or does not impair the desired morphological structure of the PCC.

The foregoing and other objects are solved by the subject-matter as defined herein in the independent claims.

According to one aspect of the present invention, a process for producing an aqueous suspension of precipitated calcium carbonate is provided, comprising the steps of:
  i) providing a calcium oxide containing material,
  ii) providing a precipitation enhancer selected from the group consisting of calcium carbonate nanoparticles and/or a water-soluble calcium salt,
  iii) preparing a milk of lime by mixing water, the calcium oxide containing material of step i), and the precipitation enhancer of step ii), and
  iv) carbonating the milk of lime obtained from step iii) to form an aqueous suspension of precipitated calcium carbonate.

According to a further aspect a process for producing precipitated calcium carbonate is provided comprising the steps i) to iv) of the process according to the present invention, and further a step v) of separating the precipitated calcium carbonate from the aqueous suspension obtained from step iv).

According to still a further aspect of the present invention, an aqueous suspension of precipitated calcium carbonate obtainable by the process according to the present invention is provided.

According to still a further aspect of the present invention, precipitated calcium carbonate obtainable by a process according to the present invention is provided.

According to still a further aspect of the present invention, a product comprising the precipitated calcium carbonate according to the present invention is provided, wherein preferably the product is a paper, a paper product, an ink, a paint, a coating, a plastic, a polymer composition, an adhesive, a building product, a foodstuff, an agricultural product, a cosmetic product or a pharmaceutical product, and more preferably the product is a plastic or a polymer composition.

According to still a further aspect of the present invention a use of an aqueous suspension of precipitated calcium carbonate according to the present invention in paper, plastics, polymer compositions, paint, coatings, concrete, cosmetics, pharmaceutics and/or agriculture applications is provided.

According to still a further aspect of the present invention a use of a precipitated calcium carbonate according to the present invention in paper, plastics, polymer compositions, paint, coatings, concrete, cosmetics, pharmaceutics and/or agriculture applications is provided, wherein preferably a dried precipitated calcium carbonate is used in plastics and/or polymer compositions.

According to still a further aspect of the present invention a use of calcium carbonate nanoparticles and/or a water-soluble calcium salt in a process for producing an aqueous suspension of precipitated calcium carbonate is provided.

Advantages embodiment of the present invention are defined in the corresponding sub-claims.

According to one embodiment step iii) comprises the steps of: a1) mixing the calcium oxide containing material of step i) with water, and a2) adding the precipitation enhancer of step ii) to the mixture of step a1). According to another embodiment step iii) comprises the steps of: b1) mixing the precipitation enhancer of step ii) with water, and b2) adding the calcium oxide containing material of step i) to the mixture of step b1).

According to one embodiment the calcium carbonate nanoparticles have a number based median particle size $d_{50}$ of less than 150 nm, preferably from 1 to 130 nm, more preferably from 5 to 90 nm, even more preferably from 10 to 80 nm, and most preferably from 30 to 70 nm. According to one embodiment the water-soluble calcium salt is an anhydrous salt or hydrate salt, preferably selected from the group consisting of calcium nitrate, calcium sulfate, calcium acetate, calcium benzoate, calcium bicarbonate, calcium bromate, calcium bromide, calcium chlorate, calcium chloride, calcium iodite, calcium nitrite, calcium perchlorate, calcium permanganate, hydrates thereof, and mixtures thereof, more preferably selected from the group consisting of calcium nitrate, calcium sulfate, calcium acetate, calcium benzoate, calcium bicarbonate, calcium bromate, calcium bromide, calcium chlorate, calcium chloride, calcium iodite, calcium nitrite, calcium perchlorate, calcium permanganate, calcium nitrate tetrahydrate, calcium chloride dihydrate, and mixtures thereof, and most preferably selected from the group consisting of calcium nitrate, calcium nitrate tetra hydrate, calcium chloride, calcium chloride dihydrate, and mixtures thereof.

According to one embodiment the precipitation enhancer of step ii) is added in an amount from 0.01 to 25 wt.-%, based on the total weight of the calcium oxide containing material, preferably in an amount from 0.1 to 20 wt.-%, more preferably from 1 to 15 wt.-%, and most preferably from 5 to 10 wt.-%.

According to one embodiment a slaking additive is added before, during or after step iii), preferably the slaking additive is selected from the group consisting of organic acids, organic acid salts, sugar alcohols, monosaccharides, disaccharides, polysaccharides, gluconates, phosphonates, lignosulfonates, and mixtures thereof. According to another embodiment the slaking additive is added in an amount from 0.01 to 2 wt.-%, based on the total amount of calcium oxide containing material, preferably in an amount from 0.05 to 1 wt.-%, more preferably in an amount from 0.06 to 0.8 wt.-%, and most preferably in an amount from 0.07 to 0.5 wt.-%.

According to one embodiment the obtained suspension of precipitated calcium carbonate has a solids content of at least 5 wt.-%, preferably from 10 to 50 wt.-%, more preferably from 12 to 45 wt.-%, and most preferably from 14 to 40 wt.-%, based on the total weight of the suspension. According to another embodiment the obtained precipitated calcium carbonate has a portlandite content of less than 1 wt.-%, and preferably less than 0.1 wt.-%, based on the total weight of the dried precipitated calcium carbonate. According to still another embodiment the milk of lime is screened after step iii) and before step iv), preferably with a screen having a sieve size from 100 to 300 μm.

According to one embodiment the process for producing precipitated calcium carbonate further comprises a step vi) of drying the separated precipitated calcium carbonate obtained from step v), and optionally a step vii) of contacting at least a part of the surface of the precipitated calcium carbonate with a surface-treatment agent. According to another embodiment the precipitated calcium carbonate obtainable by the process of the present invention is a dried precipitated calcium carbonate, optionally comprising a treatment layer on at least a part of the surface of the precipitated calcium carbonate.

It should be understood that for the purpose of the present invention, the following terms have the following meaning:

A "calcium oxide containing material" in the meaning of the present invention can be a mineral or a synthetic material having a content of calcium oxide of at least 50 wt.-%, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example by a cyclone or classifier.

Throughout the present document, the "particle size" of precipitated calcium carbonate, or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value of particles in the range of 0.2 to 100 µm a Sedigraph 5100 or 5120 device from the company Micromeritics, USA, can be used. For the purpose of the present invention, the "particle size" of calcium carbonate nanoparticles is described as number determined particle size distribution. For determining the number based particle size distribution, e.g., the number based median particle size ($d_{50}$) or the number based top cut particle size ($d_{98}$) of calcium carbonate nanoparticles, a Malvern Zetasizer Nano ZS can be used.

For the purpose of the present invention, the term "nanoparticles" refers to fine particles having a number based particle size distribution in the nanometer range. For example, the nanoparticles may have a number based median particle size $d_{50}$ of less than 150 nm in all three dimensions of the particle. For determining the number based median particle size $d_{50}$ value or the number based top cut particle size $d_{98}$ value of nanoparticles, a Malvern Zetasizer Nano ZS can be used.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2 524 898 A1, EP 2 371 766 A1, or WO 2013/142473 A1.

As used herein, the term "portlandite" refers to $Ca(OH)_2$, which can be present in a trigonal crystal structure, and may be formed during lime slaking.

For the purpose of the present invention, the "solids content" of a liquid composition is a measure of the amount of material remaining after all the solvent or water has been evaporated.

A "specific BET surface area" (SSA) in the meaning of the present invention is defined as the surface area of the precipitated calcium carbonate particles divided by the mass of PCC particles. As used therein the specific surface area is measured by adsorption using the BET isotherm (ISO 9277: 1995) and is specified in $m^2/g$.

For the purpose of the present invention, the term "viscosity" or "Brookfield viscosity" refers to Brookfield viscosity. The Brookfield viscosity is for this purpose measured by a Brookfield (Type RVT) viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1600 mPa·s the spindle number 4 may be used, and for a viscosity range between 800 and 3200 mPa·s the spindle number 5 may be used.

For the purpose of the present application, "water-insoluble" materials are defined as materials which, when 100 g of said material is mixed with 100 g deionised water and filtered on a filter having a 0.2 µm pore size at 20° C. to recover the liquid filtrate, provide less than or equal to 0.1 g of recovered solid material following evaporation at 95 to 100° C. of 100 g of said liquid filtrate. "Water-soluble" materials are defined as materials which, when 100 g of said material is mixed with 100 g deionised water and filtered on a filter having a 0.2 µm pore size at 20° C. to recover the liquid filtrate, provide more than 0.1 g of recovered solid material following evaporation at 95 to 100° C. of 100 g of said liquid filtrate.

A "suspension" or "slurry" in the meaning of the present invention comprises insoluble solids and water, and optionally further additives, and usually contains large amounts of solids and, thus, is more viscous and can be of higher density than the liquid from which it is formed.

Unless specified otherwise, the term "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

The "total moisture content" of a material refers to the percentage of moisture (i.e. water) which may be desorbed from a sample upon heating to 220° C.

Where the term "comprising" is used in the present description and claims, it does not exclude other elements. For the purposes of the present invention, the term "consisting of" is considered to be a preferred embodiment of the term "comprising of". If, hereinafter, a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive process for producing an aqueous suspension of precipitated calcium carbonate comprises the steps of (i) providing a calcium oxide containing material, (ii) providing a precipitation enhancer, (iii) preparing a milk of lime by mixing water, the calcium oxide containing material of step (i), and the precipitation enhancer of step (ii), and (iv) carbonating the milk of lime obtained from step (iii) to form an aqueous suspension of precipitated calcium carbonate. The precipitation enhancer is selected from the group consisting of calcium carbonate nanoparticles and/or a water-soluble calcium salt.

In the following details and preferred embodiments of the inventive process will be set out in more details. It is to be understood that these technical details and embodiments also apply to the inventive use as well as to the inventive products and their use.

Process Step i)

In step i) of the process of the present invention, a calcium oxide containing material is provided.

The calcium oxide containing material of step i) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates; natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcination process in order to obtain a calcium oxide containing material.

Calcium carbonate decomposes at about 1000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step i) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 75 wt.-%, preferably at least 90 wt.-%, and most preferably 95 wt.-%, based on the total weight of the calcium oxide containing material. According to one embodiment, the calcium oxide containing material consists of solely calcium oxide.

The calcium oxide containing material can consist of only one type of calcium oxide containing material. Alternatively, the calcium oxide containing material can consist of a mixture of two or more types of calcium oxide containing materials.

The calcium oxide containing material can be used in the inventive process in its original form, i.e. as a raw material, for example, in form of smaller and bigger chunks. Alternatively, the calcium oxide containing material can be ground before use. According to one embodiment of the present invention, the calcium oxide containing material is in forms of particles having weight median particle size $d_{50}$ from 0.1 to 1000 μm, and preferably from 1 to 500 μm.

Process Step ii)

In step ii) of the process of the present invention a precipitation enhancer is provided, wherein the precipitation enhancer is selected from the group consisting of calcium carbonate nanoparticles and/or a water-soluble calcium salt.

According to one embodiment, calcium carbonate nanoparticles are selected as precipitation enhancer. Thus, in process step ii) calcium carbonate nanoparticles are provided.

The calcium carbonate may be a ground calcium carbonate, a precipitated calcium carbonate, or a mixture thereof.

Ground (or natural) calcium carbonate (GCC) is understood to be a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the source of ground calcium carbonate (GCC) is selected from marble, chalk, dolomite, limestone, or mixtures thereof. Preferably, the source of ground calcium carbonate is selected from marble. According to one embodiment of the present invention the GCC is obtained by dry grinding. According to another embodiment of the present invention the GCC is obtained by wet grinding and subsequent drying.

"Dolomite" in the meaning of the present invention is a carbonic calcium-magnesium-mineral having the chemical composition of $CaMg(CO_3)_2$ ("$CaCO_3.MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

According to one embodiment of the present invention, the calcium carbonate nanoparticles comprise one ground calcium carbonate. According to another embodiment of the present invention, the calcium carbonate nanoparticles comprise a mixture of two or more ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation by combining calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate nanoparticles comprise one precipitated calcium carbonate. According to another embodiment of the present invention, the calcium carbonate nanoparticles comprise a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to one embodiment of the present invention, the calcium carbonate nanoparticles are ground calcium carbonate nanoparticles. According to another embodiment of the present invention, the calcium carbonate nanoparticles are precipitated calcium carbonate nanoparticles. According to still another embodiment of the present invention, the calcium carbonate nanoparticles are a mixture of ground calcium carbonate nanoparticles and precipitated calcium carbonate nanoparticles.

According to one embodiment of the present invention the calcium carbonate nanoparticles have a number based median particle size $d_{50}$ of less than 150 nm. According to a preferred embodiment of the present invention the calcium carbonate nanoparticles have a number based median particle size $d_{50}$ from 1 to 130 nm, preferably from 5 to 90 nm, more preferably from 10 to 80 nm, and most preferably from 30 to 70 nm.

According to one embodiment of the present invention the calcium carbonate nanoparticles have a number based top cut particle size $d_{98}$ of less than 350 nm. According to a preferred embodiment of the present invention the calcium carbonate nanoparticles have a number based top cut particle size $d_{98}$ from 80 to 330 nm, preferably from 90 to 180 nm, more preferably from 100 to 170 nm.

If the calcium carbonate to be used does not yet have the desired or required fineness, i.e., particle size, it may be ground in one or more wet or dry grinding steps, preferably several grinding steps, e.g., two dry and/or wet steps, preferably aqueous grinding steps, to yield the corresponding spherical equivalent diameter.

The grinding may be performed in any of the known grinding equipment with which those skilled in the art are familiar for grinding calcium carbonate. Conventional ball mills are especially suitable for dry grinding; jet plate mills as well as attritor mills are suitable for wet grinding and combinations of such mills or combinations of one or more such mills with cyclones and screens are also very suitable. Especially conventional attritor mills such as those distributed by the company Dynomill are suitable for wet grinding.

In the case of dry grinding, preferably ball mills are used and preferably iron and/or porcelain beads with a diameter of 0.5 to 10 cm are used as grinding media, especially preferably iron-cylpebs with a diameter of 2.5 cm are used.

Grinding balls made of, e.g., zirconium silicate, zirconium dioxide and/or baddeleite with a diameter of 0.2 to 5 mm, preferably 0.2 to 2 mm, but also 0.5 to 5 mm, e.g., 0.5 to 2 mm, are preferred for wet grinding. Quartz sand having an equivalent spherical diameter of 0.1 to 2 mm may also be used.

The calcium carbonate particles in the nanometer range, however, are preferably produced by wet grinding and/or are brought to the desired equivalent diameter, in particular when the material is ground calcium carbonate.

Both dry and wet grinding steps may be performed one after the other, but then the last grinding step is preferably a wet grinding.

The calcium carbonate nanoparticles may have a low portlandite content. According to one embodiment, the calcium carbonate nanoparticles contain less than 5 wt.-% portlandite, based on the total weight of the dried calcium carbonate nanoparticles, preferably less than 3 wt.-%, more preferably less than 1 wt.-%, and most preferably less than 0.1 wt.-%.

The calcium carbonate nanoparticles can be produced by any method known in the art.

According to one embodiment of the present invention, precipitated calcium carbonate nanoparticles are obtained by a process comprising the steps of:
I) providing a calcium oxide containing material,
II) providing a sugar,
III) preparing a milk of lime by mixing water, the calcium oxide containing material of step I), and the sugar of step II),
IV) carbonating the milk of lime obtained from step III) to form an aqueous suspension of precipitated calcium carbonate nanoparticles, and
V) separating the precipitated calcium carbonate nanoparticles from the aqueous suspension obtained from step IV).

The sugar may be selected from monosaccharides, disaccharides, and/or polysaccharides. According to one embodiment, the sugar is added in an amount from 0.1 to 20 wt.-%, based on the total weight of the calcium oxide containing material provided in step I), preferably in an amount from 1 to 10 wt.-%, and more preferably in an amount from 2 to 5 wt.-%. Preferably, the sugar is selected from lactose or sucrose.

The calcium carbonate nanoparticles can be provided in dry form. Alternatively, the calcium carbonate nanoparticles can be suspended in water, and thus, form an aqueous suspension or slurry of the calcium carbonate nanoparticles. The obtained suspension can be ground under conditions such that autogenous grinding takes place and/or by horizontal ball milling, and/or other such processes known to the skilled man.

According to one embodiment of the present invention, the calcium carbonate nanoparticles are in form of a suspension or a filter cake having a solids content of at least 1 wt.-%, preferably from 1 to 50 wt.-%, more preferably from 3 to 40 wt.-%, even more preferably from 5 to 30 wt.-%, and most preferably from 10 to 20 wt.-%, based on the total weight of the suspension or filter cake.

According to another embodiment, a water-soluble calcium salt is selected as precipitation enhancer. Thus, in process step ii) a water-soluble calcium salt is provided.

The water-soluble calcium salt can be an anhydrous salt or a hydrate salt. According to a preferred embodiment the water-soluble calcium salt is selected from the group consisting of calcium nitrate, calcium sulfate, calcium acetate, calcium benzoate, calcium bicarbonate, calcium bromate, calcium bromide, calcium chlorate, calcium chloride, calcium iodite, calcium nitrite, calcium perchlorate, calcium permanganate, hydrates thereof, and mixtures thereof. As used herein, a "hydrate" is an inorganic salt containing water molecules combined in a definite ratio as an integral part of the crystal. Depending on the number of water molecules per formula unit of salt, the hydrate may be designated as monohydrate, dihydrate, trihydrate, tetrahydrate, pentahydrate, hexahydrate, heptahydrate, octahydrate, nonahydrate, decahydrate, hemihydrate, etc.

Preferably, the water-soluble calcium salt is selected from the group consisting of calcium nitrate, calcium sulfate, calcium acetate, calcium benzoate, calcium bicarbonate, calcium bromate, calcium bromide, calcium chlorate, calcium chloride, calcium iodite, calcium nitrite, calcium perchlorate, calcium permanganate, calcium nitrate tetrahydrate, calcium chloride dihydrate, and mixtures thereof, and more preferably the water-soluble calcium salt is selected from the group consisting of calcium nitrate, calcium nitrate tetrahydrate, calcium chloride, calcium chloride dihydrate, and mixtures thereof.

According to one embodiment of the present invention, the water-soluble calcium salt consists of one water-soluble calcium salt only. Alternatively, the water-soluble calcium salt can consist of a mixture of two or more water-soluble calcium salts.

The water-soluble calcium salt can be provided in form of a solution or as a dry material. According to one embodiment, the water-soluble calcium salt is provided in form of an aqueous solution having a calcium salt concentration from 1 to 70 wt.-%, based on the total weight of the aqueous solution, and preferably from 2 to 60 wt.-%.

According to a preferred embodiment of the present invention, the precipitation enhancer is a mixture of calcium carbonate nanoparticles and one or more water-soluble calcium salt(s). According to one embodiment, the precipitation enhancer comprises the calcium carbonate nanoparticles and the water-soluble salt(s) in a mass ratio from 1:10 to 10:1, preferably in a mass ratio from 1:5 to 5:1, more preferably in mass ratio from 1:2 to 2:1, and most preferably in a mass ratio of about 1:1.

According to one embodiment of the present invention, the precipitation enhancer comprises precipitated calcium carbonate nanoparticles and calcium nitrate or hydrates thereof.

According to one embodiment of the present invention, the precipitation enhancer of step ii) is added in an amount from 0.01 to 25 wt.-%, based on the total weight of the calcium oxide containing material, preferably in an amount from 0.1 to 20 wt.-%, more preferably from 1 to 15 wt.-%, and most preferably from 5 to 10 wt.-%.

According to one aspect of the present invention, a use of calcium carbonate nanoparticles and/or a water-soluble calcium salt in a process for producing an aqueous suspension of precipitated calcium carbonate is provided.

Conventional methods for preparing PCC suffer from the problem that a significant amount of portlandite is retained or trapped during the precipitating process. The inventors surprisingly found that the addition of a precipitation enhancer selected from the group consisting of calcium carbonate nanoparticles and/or a water-soluble calcium salt during or after the lime slaking step of a process for producing PCC allows the preparation of PCC with a low portlandite content, for example, with a portlandite content of less than 1 wt. %, or less than 0.1 wt.-%, based on the total weight of the dried PCC.

Nucleation and growth of precipitated calcium carbonate may occur, when the saturation S>1. S can be expressed as the quotient of the ionic activity product IP and the solubility product $K_{sp}$:

$$S = \frac{IP}{K_{sp}}$$

The ionic activity product, IP, may be defined as being directly proportional to the product of all constituent ions for a given product, in solution. For instance, the ionic product of calcium carbonate would be directly proportional to the product of the calcium and carbonate ionic concentrations (or equal to the product of their activities).

The solubility product, $K_{sp}$, would then be defined as the ionic activity product at equilibrium. Conversely, when S<1, dissolution of calcium carbonate is favoured.

It is believed that nucleation and growth may not necessarily occur immediately after surpassing S. Rather, thermodynamic energy principals must be met, i.e., the ionic product must be sufficiently high that the energy released from precipitation surpasses the energy required for the surface liquid interactions. As used in the present invention, the term "homogeneous nucleation" refers to the formation of clusters sufficiently large at a given saturation level to overcome the surface energy requirements, and thus, form a stable solid, without the need of other solids present. "Heterogeneous nucleation" in the meaning of the present invention defines as nucleation at a foreign surface, whereby the foreign surface lowers the total surface energy requirements. "Homogeneous crystal growth" in the meaning of the present invention refers to the precipitation of the solid in question at a surface of equal composition. This may occur at its newly nucleated surface, or at surfaces of the sample composition already present in the solution.

The inventors believe that typical slaked-lime PCC precipitation occurs by the heterogeneous nucleation of calcium carbonate at the portlandite surface, or, if still homogeneous nucleation (away from any surface), then still very near to the portlandite surface, where the calcium ion concentrations are at maximum. Without being bound to any theory, it is believed that the precipitation enhancer of the present invention works by promoting homogeneous nucleation and/or homogeneous growth, separate from the calcium hydroxide surface.

For example, it is believed that calcium carbonate nanoparticles can promote homogeneous growth by providing a more favourable surface for precipitation during the carbonation step than the surface of the portlandite particles. It is also believed that the water-soluble calcium salts can promote homogeneous nucleation by increasing the oversaturation levels in the solution. Thereby, the influences of high saturation levels at the portlandite particle surface may be at least partially compensated, and thus, allowing the newly precipitated calcium carbonate to form its own nuclei and grow away from the portlandite surface. As a result a precipitated calcium carbonate with a significantly reduced portlandite content can be obtained. Preferably, the portlandite content of the obtained PCC is at a level, which is not detectable any more by X-ray diffraction. The inventors also found that a combination of calcium carbonate nanoparticles and a water-soluble calcium salt can be especially effective as precipitation enhancer.

Process Step iii)

In step iii) of the process of the present invention, a milk of lime is prepared by mixing water, the calcium oxide containing material of step i), and the precipitation enhancer of step ii).

The reaction of the calcium oxide containing material with water results in the formation of a milky calcium hydroxide suspension, better known as milk of lime. Said reaction is highly exothermic and is also designated as "lime slaking" in the art.

According to one embodiment of the present invention, the temperature of the water, which is used in mixing step iii), i.e. the temperature of the water that is used to slake the calcium oxide containing material, is adjusted to be in the range from more than 0° C. and less than 100° C. In other words, the water that is used to slake the calcium oxide containing material is adjusted to a temperature range, in which the water is in liquid form. Preferably, the temperature of the water, which is employed in mixing step iii) is adjusted to be from 1° C. to 70° C., more preferably from 2° C. to 50° C., even more preferably from 30° C. to 50° C., and most preferably from 35 to 45° C. It will be apparent to the skilled person that the initial temperature of the water is not necessarily the same one as the temperature of the mixture prepared in step iii) due to the highly exothermic slaking reaction and/or due to the mixing of substances having different temperatures.

According to one embodiment, step iii) comprises the steps of:
a1) mixing the calcium oxide containing material of step i) with water, and
a2) adding the precipitation enhancer of step ii) to the mixture of step a1).

Preferably, process step a2) is carried out after the reaction between the calcium oxide containing material of step i) with water is completed, i.e. after the lime has been completely slaked.

According to another embodiment, process step iii) comprises the steps of:
b1) mixing the precipitation enhancer of step ii) with water, and
b2) adding the calcium oxide containing material of step i) to the mixture of step b1).

According to still another embodiment, step iii) the calcium oxide containing material of step i), the precipitation enhancer of step ii), and water are mixed simultaneously.

The precipitation enhancer of step ii) may be added in step iii) in one portion or in several portions. According to one embodiment, in step iii) the precipitation enhancer of step ii) is mixed with the water, and the calcium oxide containing material of step i), by adding the precipitation enhancer in one portion or in two, three, four, five, or more portions.

Process step iii) may be performed at room temperature, i.e. at a temperature of 20° C.±2° C., or at an initial temperature of 30 to 50°, preferably 35 to 45° C. Since the reaction is exothermic, the temperature typically raises to a temperature between 70 and 85° C. during step iii). According to a preferred embodiment, process step iii) is performed with mixing, agitation, or stirring, for example, mechanical stirring. Suitable process equipment for mixing, agitation or stirring is known to the skilled person.

The progress of the slaking reaction may be observed by measuring the temperature and/or conductivity of the reaction mixture. It can also be monitored by turbidity control. Alternatively or additionally, the progress of the slaking reaction can be inspected visually.

According to one embodiment, the calcium oxide containing material and the water are mixed in a mass ratio from 1:4 to 1:15. According to one preferred embodiment, in step iii) the calcium oxide containing material and the water are mixed in a mass ratio from 1:5 to 1:9.

According to one embodiment, the milk of lime of step iii) has a solids content from 5 to 25 wt.-%, based on the total weight of the milk of lime, preferably from 10 to 20 wt.-%, and most preferably from 10 to 15 wt.-%.

According to one embodiment, the milk of lime of step iii) has a Brookfield viscosity from 1 to 1000 mPa·s at 25° C., more preferably from 5 and 800 mPa·s at 25° C., and most preferably from 10 and 600 mPa·s at 25° C. According to one embodiment, the Brookfield viscosity is measured at 100 rpm.

It is within the confines of the present invention that additional water may be introduced during the slaking reaction in order to control and/or maintain and/or achieve the desired solids content or Brookfield viscosity or temperature of the milk of lime.

Process step iii) can be carried out in form of a batch process, a semi-continuous or a continuous process.

Process Step iv)

In step iv) of the process of the present invention, the milk of lime obtained from step iii) is carbonated to form an aqueous suspension of precipitated calcium carbonate.

The carbonation is carried out by means and under conditions well-known by the person skilled in the art. The introduction of carbon dioxide into the milk of lime quickly results in the formation of the carbonate ion ($CO_3^{2-}$), and thus, the requisite concentration for calcium carbonate to be formed. Particularly, the carbonation reaction can be readily controlled considering the reactions involved in the carbonation process. Carbon dioxide dissolves according to its partial pressure forming carbonate ions via the formation of carbonic acid ($H_2CO_3$), which, in such an alkaline solution, dissociates to its constituent hydrogen and carbonate ions. Once the ionic product of calcium carbonate is sufficiently greater than the solubility product, calcium carbonate precipitates. At the same time, hydroxide ions are neutralized by the dissociated hydrogen ions. As a result the ionic product for calcium hydroxide would therefore be less than the solubility product, and it would continue to dissolve. This occurs continually, so long as $CO_2$ is bubbled into solution, until all calcium hydroxide is consumed, or is trapped in the calcium carbonate crystal structure. It is the inventors' belief that the methods demonstrated in this patent application, by avoiding nucleation/growth near the calcium hydroxide surface, significantly minimize the trapping of calcium hydroxide, thus resulting in its near full consumption.

According to one embodiment of the present invention, in step iv) the carbonation is carried out by feeding pure gaseous carbon dioxide or technical gases containing at least 10 vol.-% of carbon dioxide into the milk of lime.

The progress of the carbonation reaction can be readily observed by measuring the conductivity, density, turbidity and/or pH. In this respect, the pH of the milk of lime before addition of carbon dioxide will be more than 10, usually between 11 and 12.5, and will constantly decrease until a pH of about 7 is reached. At this point the reaction can be stopped.

Conductivity slowly decreases during the carbonation reaction and rapidly decreases to low levels, when the precipitation is completed. The progress of the carbonation may be monitored by measuring the pH and/or the conductivity of the reaction mixture.

According to one embodiment of the present invention, the temperature of the milk of lime obtained from step iii), which is used in step iv) is adjusted to be in the range from 10° C. to 60° C. It will be apparent to the skilled person that the initial temperature of the milk of lime is not necessarily the same one as the temperature of the mixture prepared in step iii) due to the exothermic carbonation reaction and/or due to the mixing of substances having different temperatures.

According to one embodiment of the present invention, step iv) is carried out at a temperature from 5 to 95° C., preferably from 30 to 70° C., and more preferably from 40 to 60° C.

Process step iv) can be carried out in form of a batch process, a semi-continuous or a continuous process. According to one embodiment, the process of the present invention involving the process steps i) to iv) is carried out in form of a batch process, a semi-continuous or a continuous process.

According to one embodiment of the present invention, the obtained precipitated calcium carbonate has a weight median particle size $d_{50}$ from 0.1 to 100 µm, preferably from 0.25 to 50 µm, more preferably from 0.3 to 5 µm, and most preferably from 0.4 to 3.0 µm.

The precipitated calcium carbonate may have aragonitic, calcitic, or vateritic crystal structure, or mixtures thereof. It is a further advantage of the present invention that the crystal structure and morphology of the precipitated calcium carbonate can be controlled, e.g. by addition of seed crystals or other structure modifying chemicals. According to a preferred embodiment, the precipitated calcium carbonate obtained by the inventive process has a clustered scalenohedral crystal structure.

The morphological structure of the precipitated calcium carbonate can also be controlled by carrying out process step iv) in a specific temperature range. According to one embodiment of the present invention, step iv) is carried out at a temperature from 40 to 60° C. to form an aqueous suspension of scalenohedral PCC. According to another embodiment of the present invention, step iv) is carried out at a temperature from 10 to 25° C. to form an aqueous suspension of rhombohedral PCC.

The BET specific surface area of the precipitated calcium carbonate obtained by the process according to the present invention may be from 1 to 100 m²/g, preferably from 2 to 70 m²/g, more preferably from 3 to 50 m²/g, especially from 4 to 30 m²/g, measured using nitrogen and the BET method according to ISO 9277. The BET specific surface area of the precipitated calcium carbonate obtained by the process of the present invention may be controlled by the use of additives, e.g. surface active agents, shearing during the precipitation step or thereafter at high mechanical shearing rates not only leading to a low particle size, but also to a high BET specific surface area.

According to one embodiment of the present invention, the obtained suspension of precipitated calcium carbonate has a solids content of at least 5 wt.-%, preferably from 10 to 50 wt.-%, more preferably from 12 to 45 wt.-%, and most preferably from 14 to 40 wt.-%, based on the total weight of the suspension.

According to one embodiment of the present invention, the suspension of PCC of step iv) has a Brookfield viscosity of less than or equal to 1000 mPa·s at 25° C., more preferably less than or equal to 800 mPa·s at 25° C., and most preferably less than or equal to 600 mPa·s at 25° C. The Brookfield viscosity may be measured at 100 rpm.

According to one embodiment of the present invention, the precipitated calcium carbonate obtained by the inventive process has a portlandite content of less than 1 wt.-%, preferably less than 0.1 wt.-%, based on the total weight of the dried precipitated calcium carbonate.

Additional Process Steps

The process of the present invention can comprise additional process steps.

The milk of lime may be screened in order to remove oversize particles. A suitable screen can include, for example, a screen having a sieve size from 700 to 100 µm, for example, about 100 or about 300 µm. According to one embodiment of the present invention, the milk of lime is screened after step iii) and before step iv), preferably with a screen having a sieve size from 100 to 300 µm.

According to still another embodiment of the present invention, at least one slaking additive is added before, during or after step iii) of the inventive process. By adding a slaking additive, the size of the PCC particles and their crystal morphology can be controlled without affecting the viscosity of the aqueous suspension.

The at least one slaking additive may be selected from the group consisting of organic acids, organic acid salts, sugar alcohols, monosaccharides, disaccharides, polysaccharides, gluconates, phosphonates, lignosulfonates, and mixtures thereof. According to one embodiment of the present invention, the at least one slaking additive is selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and mixtures thereof. According to a preferred embodiment, the at least one slaking additive is sodium citrate and/or saccharose.

According to one embodiment of the present invention, the at least one slaking additive consists of one type of slaking additive only. Alternatively, the at least one slaking additive can consist of a mixture of two or more types of slaking additives.

The at least one slaking additive may be provided in an amount from 0.01 to 0.2 wt.-%, based on the total amount of calcium oxide containing material, preferably in an amount from 0.05 to 1 wt.-%, more preferably from 0.06 to 0.8 wt.-%, and most preferably from 0.07 to 0.5 wt.-%.

According to a further aspect of the present invention, a process for producing precipitated calcium carbonate is provided, the process comprising the steps of:
i) providing a calcium oxide containing material,
ii) providing a precipitation enhancer selected from the group consisting of calcium carbonate nanoparticles and/or a water-soluble calcium salt,
iii) preparing a milk of lime by mixing water, the calcium oxide containing material of step i), and the precipitation enhancer of step ii),
iv) carbonating the milk of lime obtained from step iii) to form an aqueous suspension of precipitated calcium carbonate, and
v) separating the precipitated calcium carbonate from the aqueous suspension obtained from step iv).

For the purpose of the present invention, the expression "separating" means that the PCC is removed or isolated from the aqueous suspension obtained from step iv) of the inventive process. The precipitated calcium carbonate obtained from step iv) may be separated from the mother liquor by any conventional means of separation known to the skilled person. According to one embodiment of the present invention, in process step v) the PCC is separated mechanically and/or thermally. Examples for mechanical separation processes are filtration, e.g. by means of a drum filter or filter press, nanofiltration, or centrifugation. An example for a thermal separation process is an up-concentration process by the application of heat, for example, in an evaporator. According to a preferred embodiment, in process step v) the PCC is separated mechanically, preferably by filtration and/or centrifugation.

It is also preferred that the mother liquor obtained after precipitation and/or any one of the reactants may be recycled into the process.

The obtained PCC may be further processed, e.g., may be deagglomerated or subjected to a dry grinding step. Otherwise, it may also be wet ground in form of a suspension. If the PCC is subjected to dewatering, dispersion and/or grinding steps, these steps may be accomplished by procedures known in the art. Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Dispersants also can be included to prepare dispersions if desired.

According to still a further aspect of the present invention, the process for producing precipitated calcium carbonate comprising steps i) to v) further comprises a step vi) of drying the separated precipitated calcium carbonate obtained from step v), and optionally a step vii) of contacting at least a part of the surface of the precipitated calcium carbonate with a surface-treatment agent.

According to one embodiment of the present invention, a process for producing dried precipitated calcium carbonate is provided, the process comprising the steps of:
i) providing a calcium oxide containing material,
ii) providing a precipitation enhancer selected from the group consisting of calcium carbonate nanoparticles and/or a water-soluble calcium salt,
iii) preparing a milk of lime by mixing water, the calcium oxide containing material of step i), and the precipitation enhancer of step ii),
iv) carbonating the milk of lime obtained from step iii) to form an aqueous suspension of precipitated calcium carbonate,
v) separating the precipitated calcium carbonate from the aqueous suspension obtained from step iv), and
vi) drying the separated precipitated calcium carbonate obtained from step v).

Optionally, the process for producing dried precipitated calcium carbonate further comprises a step of concentrating the separated precipitated calcium carbonate obtained from step v) before step vi). Suitable concentration methods are known to the skilled person. For example, the desired concentration may be achieved by means of a thermal process, e.g., in an evaporator under ambient, atmospheric pressure or at reduced pressure, or by means of a mechanical process, e.g., in a filter press, such as nanofiltration, and/or centrifuge.

In general, the drying step vi) may take place using any suitable drying equipment and can, for example, include thermal drying and/or drying at reduced pressure using equipment such as an evaporator, a flash drier, an oven, a spray drier and/or drying in a vacuum chamber.

According to one embodiment, drying step vi) is a spray drying step, preferably said spray drying step is carried out at a lower temperature ranging from 200° C. to 400° C., and preferably from 250° C. to 350° C. By means of drying step vi), a dried precipitated calcium carbonate is obtained having a low total moisture content which is less than or equal to 1.0 wt.-%, based on the total weight of the dried precipitated calcium carbonate.

According to another embodiment, the dried PCC of step vi) has a total moisture content of less than or equal to 0.5 wt.-% and preferably less than or equal to 0.2 wt.-%, based on the total weight of the dried precipitated calcium carbonate. According to still another embodiment, the dried PCC of step vi) has a total moisture content of between 0.01 and 0.15 wt.-%, preferably between 0.02 and 0.10 wt.-%, and more preferably between 0.03 and 0.07 wt.-%, based on the total weight of the dried precipitated calcium carbonate.

The precipitated calcium carbonate obtained by the inventive process can be post-treated, for example, during and/or after a drying step with an additional component. According to one embodiment the precipitated calcium carbonate is treated with a fatty acid, e.g. stearic acid, a silane, or phosphoric esters of fatty acids, or a siloxane.

According to one embodiment of the present invention, the process for producing dried precipitated calcium carbonate comprises the steps i) to vi), and further a step vii) of contacting at least a part of the surface of the precipitated calcium carbonate with a surface-treatment agent. Suitable surface-treatment agents are, for example, fatty acids, fatty acid esters, aliphatic carboxylic acids, aliphatic carboxylic esters, polyacrylates, polydiallyldimethylammonium chloride (polyDADMAC), mono-substituted succinic anhydrides, mono-substituted succinic acids, or phosphoric acid esters.

According to one embodiment the surface-treatment agent is selected from mono-substituted succinic anhydrides, mono-substituted succinic acids, phosphoric acid esters, and mixtures thereof. The term "mono-substituted succinic anhydride" in the meaning of the present invention refers to a succinic anhydride wherein a hydrogen atom is substituted by another substituent. The term "mono-substituted succinic acid" in the meaning of the present invention refers to a succinic acid wherein a hydrogen atom is substituted by another substituent. Further details regarding said surface-treatment agents and methods for preparing surface-treated calcium carbonate products thereof are described in WO 2014/060286 A1 and WO 2014/128087 A1.

Products and their Use

According to the present invention, an aqueous suspension of precipitated calcium carbonate is provided, which is obtainable by a process comprising the steps of:
i) providing a calcium oxide containing material,
ii) providing a precipitation enhancer selected from the group consisting of calcium carbonate nanoparticles and/or a water-soluble calcium salt,
iii) preparing a milk of lime by mixing water, the calcium oxide containing material of step i), and the precipitation enhancer of step ii), and
iv) carbonating the milk of lime obtained from step iii) to form an aqueous suspension of precipitated calcium carbonate.

According to a further aspect of the present invention, a precipitated calcium carbonate is provided, which is obtainable by a process comprising the steps of:
i) providing a calcium oxide containing material,
ii) providing a precipitation enhancer selected from the group consisting of calcium carbonate nanoparticles and/or a water-soluble calcium salt,
iii) preparing a milk of lime by mixing water, the calcium oxide containing material of step i), and the precipitation enhancer of step ii),
iv) carbonating the milk of lime obtained from step iii) to form an aqueous suspension of precipitated calcium carbonate, and
v) separating the precipitated calcium carbonate from the aqueous suspension obtained from step iv).

The PCC suspension and/or PCC obtained by the process of the present invention may be used in various materials. According to one embodiment of the present invention, the precipitated calcium carbonate according to the present invention is used in paper, plastics, polymer compositions, paint, coatings, concrete, cosmetics, pharmaceutics and/or agriculture applications. Preferably a dried precipitated calcium carbonate is used in plastics and/or polymer compositions. According to another embodiment of the present invention, the aqueous suspension of precipitated calcium carbonate according to the present invention is used in paper, plastics, polymer compositions, paint, coatings, concrete, cosmetics, pharmaceutics and/or agriculture applications.

According to one aspect of the present invention, a product comprising the precipitated calcium carbonate according to the present invention is provided. According to a preferred embodiment, the product is a paper, a paper product, an ink, a paint, a coating, a plastic, a polymer composition, an adhesive, a building product, a foodstuff, an agricultural product, a cosmetic product or a pharmaceutical product, and more preferably the product is a plastic or a polymer composition.

According to still a further aspect of the present invention, a dried precipitated calcium carbonate is provided, which is obtainable by a process comprising the steps of:
i) providing a calcium oxide containing material,
ii) providing a precipitation enhancer selected from the group consisting of calcium carbonate nanoparticles and/or a water-soluble calcium salt,
iii) preparing a milk of lime by mixing water, the calcium oxide containing material of step i), and the precipitation enhancer of step ii),
iv) carbonating the milk of lime obtained from step iii) to form an aqueous suspension of precipitated calcium carbonate,
v) separating the precipitated calcium carbonate from the aqueous suspension obtained from step iv), and
vi) drying the separated precipitated calcium carbonate obtained from step v).

Optionally, the dried precipitated calcium carbonate may comprise a treatment layer on at least a part of the surface of the precipitated calcium carbonate. According to one embodiment, a dried precipitated calcium carbonate is provided, which is obtainable by a process comprising the steps i) to vi) and further a step vii) of contacting at least a part of the surface of the precipitated calcium carbonate with a surface-treatment agent.

According to one embodiment, the precipitated calcium carbonate obtainable by process steps i) to iv), i) to v), i) to vi), or i) to vii) has a portlandite content of less than 1 wt.-%, and preferably less than 0.1 wt.-%, based on the total weight of the dried precipitated calcium carbonate.

According to a preferred embodiment, the dried precipitated calcium carbonate obtainable from process steps i) to vi) is a dried powder of precipitated calcium carbonate.

The dried PCC obtainable from process steps i) to vi) may be used in paper, plastics, polymer compositions, paint, coatings, concrete, cosmetics, pharmaceutics and/or agriculture applications. According to a preferred embodiment, the dried precipitated calcium carbonate is used in plastics and/or polymer compositions. For example, said PCC may be used in thermoplastic polymers, such as polyvinyl chloride, polyolefins, and polystyrene. Moreover, the dried PCC may also be used in polymer coatings which may be applied on the surface of polymer articles, such as foils, in order to increase the hydrophobicity (e.g., reflected by an increased contact angle measured against water) of said surface.

According to one aspect of the present invention, a product comprising dried precipitated calcium carbonate according to the present invention, preferably a dried powder of said precipitated calcium carbonate, is provided. According to one embodiment, the product is a paper, a paper product, an ink, a paint, a coating, a plastic, a polymer composition, an adhesive, a building product, a foodstuff, an agricultural product, a cosmetic product or a pharmaceutical product. According to a preferred embodiment, a product comprising a dried precipitated calcium carbonate is provided, wherein the product is a plastic or a polymer composition.

The scope and interest of the present invention will be better understood based on the following examples which are intended to illustrate certain embodiments of the present invention and are non-limitative.

EXAMPLES

1. Measurement Methods

In the following, measurement methods implemented in the examples are described.

Particle Size Distribution of Precipitated Calcium Carbonate (PCC)

The particle size distribution of the prepared PCC particles was measured using a Sedigraph 5120 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Particle Size Distribution of Calcium Carbonate Nanoparticles

The number based particle size distribution of the calcium carbonate nanoparticles was determined by the use of a Malvern Zetasizer Nano ZS.

The samples slurry was diluted with a 0.1 wt.-% solution of $Na_4P_2O_7$ until 100 g of a slurry with a solids content of 0.5 wt.-% was attained. 1 g of Polysalz (BASF, Germany), was added and the slurry was mixed at high shear for 5 minutes. After mixing, the sample was treated in a sonication bath for 15 to 20 minutes.

The particle size distribution was determined by adding the obtained slurry to a standard 1 cm×1 cm cuvette. The cuvette was placed in the instrument, wherein the particle size was determined using dynamic light scattering. The values are reported in the number based distribution. This means that a $d_{50}$, by number, is defined as 50% of the number of particles have a diameter of less than $d_{50}$ in all three dimensions.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

X-Ray Diffraction

The purity of the PCC samples was analysed with a D8 Advance powder diffractometer (Bruker Corporation, USA) obeying Bragg's law. This diffractometer consisted of a 2.2 kW X-ray tube (Cu), a sample holder, a goniometer, and a VANTEC-1 detector. Nickel-filtered Cu $K_\alpha$ radiation was employed in all experiments ($\lambda K_{\alpha\text{-}Cu}$=1.5406 Å). The profiles were chart recorded automatically using a scan speed of 0.7° per minute in 29 (XRD GV_7600). The measurement was carried out at angles from 5 to 70°.

The resulting powder diffraction pattern was classified by mineral content using the DIFFRAC$^{suite}$ software packages EVA and SEARCH, based on reference patterns of the ICDD PDF 2 database (XRD LTM 7603). Quantitative analysis of the diffraction data, i.e. the determination of amounts of different phases in a multi-phase sample, has been performed using the DIFFRAC$^{suite}$ software package TOPAS (XRD LTM_7604). This involved modelling the full diffraction pattern (Rietveld approach) such that the calculated pattern(s) duplicated the experimental one.

2. Materials

A1: Precipitated calcium carbonate nanoparticles ($d_{50}$: 0.04 μm; $d_{98}$: 0.10 μm, portlandite content: <LOD).

A2: Precipitated calcium carbonate nanoparticles ($d_{50}$: 0.07 μm; $d_{98}$: 0.16 μm, portlandite content: <LOD).

A3: Calcium nitrate tetrahydrate, commercially available from Riedel de Haën, Germany.

A4: Ground calcium carbonate nanoparticles ($d_{50}$: 0.13 μm; $d_{98}$: 0.33 μm) produced from undispersed marble obtained from Omya SPA, Carrara, Italy.

A5: Ground calcium carbonate ($d_{50}$: 3.5 μm; $d_{98}$: 10.6 μm), commercially available from Omya SAS, Orgon, France.

LOD: limit of detection.

Preparation of PCC Nanoparticles A1 and A2:

PCC Nanoparticles A1:

A milk of lime was prepared by mixing under mechanical stirring 5 liters water with 1000 g calcium oxide (quicklime raw material from Austria) at an initial temperature of 50° C. The obtained mixture was stirred for 30 min, wherein additional 4 liters of water were added. Subsequently, the mixture was sieved through a 100 μm screen.

6.5 L of the obtained milk of lime were transferred into a stainless steel reactor. After the addition of 5 wt.-% of sucrose and 2.5 wt.-% of strontium hydroxide octahydrate, based on the total weight of calcium hydroxide, the milk of lime was heated to 60° C. Then the milk of lime was carbonated by introducing an air/$CO_2$ mixture (first 15 minutes: $CO_2$=1 L/min and air=14 L/min, rest of experiment: $CO_2$=3.6 L/min and air=11.4 L/min). During the carbonation step, the reaction mixture was stirred with a speed of 1400 rpm. The reaction was monitored by online pH and conductivity measurements.

The precipitated calcium carbonate nanoparticles were obtained by filtering the suspension and rinsing the residue with water.

PCC Nanoparticles A2:

A milk of lime was prepared by mixing under mechanical stirring 5 liters water with 800 g calcium oxide (quicklime raw material from Austria) and 0.1 wt.-%, based on the total weight of calcium oxide, dry sodium citrate as slaking additive at an initial temperature of 40° C. The obtained mixture was stirred for 30 min, wherein additional 4 liters of water were added. Subsequently, the mixture was sieved through a 100 μm screen.

8 L of the obtained milk of lime were transferred into a stainless steel reactor. After the addition of 5 wt.-% of sucrose, based on the total weight of calcium hydroxide, the milk of lime was cooled down to 10° C. Then the milk of lime was carbonated by introducing an air/$CO_2$ mixture ($CO_2$=3 L/min and air=12 L/min). During the carbonation step, the reaction mixture was stirred with a speed of 1400 rpm. The reaction was monitored by online pH and conductivity measurements.

The precipitated calcium carbonate nanoparticles were obtained by filtering the suspension and rinsing the residue with water.

3. Example

A milk of lime was prepared by mixing under mechanical stirring 5 liters water with 1000 g calcium oxide (quicklime raw material from Austria) and 0.1 wt.-%, based on the total weight of calcium oxide, dry sodium citrate as slaking additive at an initial temperature of 40° C. The obtained mixture was stirred for 30 min, wherein additional 4 liters of water were added. Subsequently, the mixture was sieved through a 100 μm screen.

The obtained milk of lime was transferred into a stainless steel reactor, wherein the milk of lime was cooled down to 50° C. Subsequently, the precipitation enhancer (if present) was added to the milk of lime (the employed precipitation enhancers are indicated in Table 1 below). Then the milk of lime was carbonated by introducing an air/$CO_2$ mixture (20 vol-% $CO_2$). During the carbonation step, the reaction mixture was stirred with a speed of 1400 rpm. The reaction was monitored by online pH and conductivity measurements.

The precipitated calcium carbonate was separated from the obtained suspension by filtration, rinsed with ethanol and dried in a drying cabinet at 90° C. The purity of the obtained precipitated calcium carbonate was controlled by X-ray diffraction using the method described above.

The characteristics of the prepared milks of lime and aqueous PCC suspensions are described in Tables 1 and 2 below.

TABLE 1

Composition of the produced milks of lime.

| Sample | Precipitation enhancer | Amount of precipitation enhancer [wt.-%, based on total weight of calcium oxide] |
|---|---|---|
| 1 (inventive) | A2 | 1 |
| 2 (inventive) | A2 | 5 |
| 3 (inventive) | A1 | 5 |
| 4 (inventive) | A3 | 5 |
| 5 (inventive) | A3 | 10 |
| 6 (inventive) | A1 | 5 |
|  | A3 | 5 |
| 7 (inventive) | A2 | 5 |
|  | A3 | 5 |
| 8 (inventive) | A4 | 5 |
| 9 (comparative) | A5 | 5 |
| 10 (comparative) | — | — |

TABLE 2

Characteristics of the obtained precipitated calcium carbonates (LOD: limit of detection).

| Sample | SSA [m²/g] | $d_{50}$ [μm] | $d_{98}$ [μm] | Calcite [wt.-%] | Portlandite [wt.-%] |
|---|---|---|---|---|---|
| 1 (inventive) | 9.30 | 1.30 | 2.40 | 99.40 | 0.6 |
| 2 (inventive) | 11.40 | 1.40 | 3.00 | 100.00 | < LOD |
| 3 (inventive) | 7.30 | 3.87 | 5.81 | 99.3 | 0.7 |
| 4 (inventive) | 5.02 | 1.32 | 3.65 | 99.3 | 0.7 |
| 5 (inventive) | 4.00 | 1.33 | 4.13 | 99.5 | 0.5 |
| 6 (inventive) | 6.90 | 1.67 | 3.78 | 100.00 | <LOD |
| 7 (inventive) | 11.80 | 1.30 | 3.20 | 100.00 | < LOD |
| 8 (inventive) | 4.70 | 1.90 | 2.50 | 99.50 | 0.5 |
| 9 (comparative) | 4.90 | 3.80 | 8.10 | 97.70 | 2.3 |
| 10 (comparative) | 4.72 | 1.62 | 4.07 | 97.20 | 2.9 |

The results compiled in Table 2 show that by the use of the inventive precipitation enhancer (samples 1 to 8), a PCC with a significantly reduced portlandite content can be obtained. Furthermore, no portlandite at all was detectable in samples 6 and 7, which was produced by using a combination of calcium carbonate nanoparticles and water-soluble calcium salt as precipitation enhancer.

The invention claimed is:

1. A process for producing an aqueous suspension of precipitated calcium carbonate having a low portlandite content comprising the steps of:
   i) providing a calcium oxide containing material having a calcium oxide content of at least 90 wt.-%,
   ii) providing a precipitation enhancer selected from the group consisting of calcium carbonate nanoparticles, a water-soluble calcium salt, and a mixture thereof, wherein the calcium carbonate nanoparticles have a number based median particle size $d_{50}$ of from 30 to 70 nm, and a portlandite content of less than 1 wt.-%, based on the total dry weight of the calcium carbonate nanoparticles,
   iii) preparing a milk of lime by mixing, in any order, water, the calcium oxide containing material of step i), and the precipitation enhancer of step ii), wherein the precipitation enhancer is included in an amount from 0.01 to 25 wt.-%, based on the total weight of the calcium oxide containing material, and
   iv) carbonating the milk of lime obtained from step iii) until an aqueous suspension of precipitated calcium carbonate having a portlandite content of less than 1 wt.-%, based on the total dry weight of the precipitated calcium carbonate, is obtained.

2. The process of claim 1, wherein step iii) comprises the steps of:
   a1) mixing the calcium oxide containing material of step i) with water, and
   a2) adding the precipitation enhancer of step ii) to the mixture of step a1).

3. The process of claim 1, wherein step iii) comprises the steps of:
   b1) mixing the precipitation enhancer of step ii) with water, and
   b2) adding the calcium oxide containing material of step i) to the mixture of step b1).

4. The process of claim 1, wherein the precipitation enhancer is calcium carbonate nanoparticles.

5. The process of claim 1, wherein the precipitation enhancer is a water-soluble calcium salt.

6. The process of claim 5, wherein the water-soluble calcium salt is an anhydrous salt or hydrate salt.

7. The process of claim 5, wherein the water-soluble calcium salt is selected from the group consisting of calcium nitrate, calcium sulfate, calcium acetate, calcium benzoate, calcium bicarbonate, calcium bromate, calcium bromide, calcium chlorate, calcium chloride, calcium iodite, calcium nitrite, calcium perchlorate, calcium permanganate, hydrates thereof, and any mixture thereof.

8. The process of claim 5, wherein the water-soluble calcium salt is selected from the group consisting of calcium nitrate, calcium sulfate, calcium acetate, calcium benzoate, calcium bicarbonate, calcium bromate, calcium bromide, calcium chlorate, calcium chloride, calcium iodite, calcium nitrite, calcium perchlorate, calcium permanganate, calcium nitrate tetrahydrate, calcium chloride dihydrate, and any mixture thereof.

9. The process of claim 5, wherein the water-soluble calcium salt is selected from the group consisting of calcium nitrate, calcium nitrate tetra hydrate, calcium chloride, calcium chloride dihydrate, and any mixture thereof.

10. The process of claim 1, wherein the precipitation enhancer of step ii) is added in an amount from 0.1 to 20 wt.-%, based on the total weight of the calcium oxide containing material.

11. The process of claim 1, wherein the precipitation enhancer of step ii) is added in an amount from 1 to 15 wt.-%, based on the total weight of the calcium oxide containing material.

12. The process of claim 1, wherein the precipitation enhancer of step ii) is added in an amount from 5 to 10 wt.-%, based on the total weight of the calcium oxide containing material.

13. The process of claim 1, wherein a slaking additive is added before, during or after step iii).

14. The process of claim 13, wherein the slaking additive is selected from the group consisting of an organic acid, an organic acid salt, a sugar alcohol, a monosaccharide, a disaccharide, a polysaccharide, a gluconate, a phosphonate, a lignosulfonate, and any mixture thereof.

15. The process of claim 13, wherein the slaking additive is added in an amount from 0.01 to 2 wt.-%, based on the total amount of calcium oxide containing material.

16. The process of claim 13, wherein the slaking additive is added in an amount from 0.05 to 1 wt.-%, based on the total amount of calcium oxide containing material.

17. The process of claim 13, wherein the slaking additive is added in an amount from 0.06 to 0.8 wt.-%, based on the total amount of calcium oxide containing material.

18. The process of claim 13, wherein the slaking additive is added in an amount from 0.07 to 0.5 wt.-%, based on the total amount of calcium oxide containing material.

19. The process of claim 1, wherein the obtained suspension of precipitated calcium carbonate has a solids content of at least 5 wt.-%, based on the total weight of the suspension.

20. The process of claim 1, wherein the obtained suspension of precipitated calcium carbonate has a solids content of from 10 to 50 wt.-%, based on the total weight of the suspension.

21. The process of claim 1, wherein the obtained suspension of precipitated calcium carbonate has a solids content of from 12 to 45 wt.-%, based on the total weight of the suspension.

22. The process of claim 1, wherein the obtained suspension of precipitated calcium carbonate has a solids content of from 14 to 40 wt.-%, based on the total weight of the suspension.

23. The process of claim 1, wherein the obtained precipitated calcium carbonate has a portlandite content of less than 0.1 wt.-%, based on the total dry weight of the precipitated calcium carbonate.

24. The process of claim 1, wherein the milk of lime is screened after step iii) and before step iv), with a screen having a sieve size from 100 to 300 μm.

25. A process for producing precipitated calcium carbonate comprising the steps i) to iv) of the process according to claim 1, and step v) of separating the precipitated calcium carbonate from the aqueous suspension obtained from step iv).

26. The process of claim 25, wherein the process further comprises step vi) of drying the separated precipitated calcium carbonate obtained from step v), and optionally a step vii) of contacting at least a part of the surface of the precipitated calcium carbonate with a surface-treatment agent.

27. The process of claim 25, wherein the process further comprises step vi) of drying the separated precipitated calcium carbonate obtained from step v), and a step vii) of contacting at least a part of the surface of the precipitated calcium carbonate with a surface-treatment agent.

\* \* \* \* \*